United States Patent [19]

Hitchcock

[11] 4,087,624

[45] May 2, 1978

[54] FIRE SHIELD FOR ELECTRICAL BOX

[76] Inventor: Robert A. Hitchcock, 1906 Danny Dr., Fort Wayne, Ind. 46808

[21] Appl. No.: 686,696

[22] Filed: May 17, 1976

[51] Int. Cl.² ............................................. A62C 3/16
[52] U.S. Cl. ....................................... 174/57; 169/48; 220/88 A
[58] Field of Search ........................... 174/57, 48, 53; 220/3.7, 3.92, 3.94, 88 R, 88 A, 3.3, 3.4, 3.5, 3.6; 169/48

[56] References Cited

U.S. PATENT DOCUMENTS

| 915,381 | 3/1909 | Pullets | 220/3.7 |
| 1,862,324 | 6/1932 | Strnad | 220/3.7 |
| 2,378,861 | 6/1945 | Peevey | 220/3.7 X |
| 2,752,217 | 6/1956 | Simon | 220/3.6 X |
| 2,989,206 | 6/1961 | McAfee | 220/3.7 |
| 3,115,265 | 12/1963 | Mulkey | 220/3.7 X |
| 3,530,230 | 9/1970 | Cormier | 174/57 X |
| 3,614,144 | 10/1971 | Hodges | 220/3.6 X |
| 3,620,404 | 11/1971 | Grasso | 220/3.5 X |
| 3,651,245 | 3/1972 | Moll | 174/57 X |
| 3,720,783 | 3/1973 | Moll | 174/57 X |

Primary Examiner—J. V. Truhe
Assistant Examiner—David A. Tone
Attorney, Agent, or Firm—Gust, Irish, Jeffers & Rickert

[57] ABSTRACT

A fire shield device for use with an electrical box mounted in an opening in a building wall for inhibiting fire in the box from reaching the walls surrounding the opening. The device is formed of fire-resistant material, such as metal or fire-resistant plastic, and comprises opposite side and end walls which define a rectangle and which are adapted to fit snugly within the box. A substantially continuous, outwardly extending peripheral flange is joined to the walls and is adapted to engage the outer surface of the building wall surrounding the opening. The walls of the device have spaced, peripherally extending grooves formed therein parallel with the edges for breaking away predetermined peripherally extending segments of the walls thereby to selectively shorten the height of the walls so as to accommodate the device to a particular box and building wall thickness. At least two opposite ones of the walls of the device may have means thereon for adjusting the length thereof, and the walls of the device may also have means thereon for breaking-away the corners defined by the walls thereby to accommodate the device to the interior of a particular box. Two opposite ones of the walls of the device may further have means thereon for breaking-away further selected segments parallel with the edges and intermediate the corners for accommodating switch or outlet-mounting lugs on the box. Two opposite ones of the flanges may have means thereon for breaking-away segments thereof to define relatively narrow, transversely extending slots intermediate the ends of the flanges for accommodating the screws which are used to secure a cover plate to a convenience outlet or switch which is mounted in the box.

3 Claims, 3 Drawing Figures

FIRE SHIELD FOR ELECTRICAL BOX

BACKGROUND OF THE INVENTION

1. Field of the Invention

This invention relates generally to fire shield devices for use with electrical boxes.

2. Description of the Prior Art

Building codes require sealing the space between the opening in a wall and an electrical box in order to prevent fire in the box from reaching the walls surrounding the opening. Commonly, the space between the wall opening and box is filled with plaster or caulking material. When an electrical box has been improperly installed, the electrician must adjust the box with some sort of tool and, in so doing, the bond of the sealing material may be broken thus necessitating resealing of the space; however, such resealing often is not done thereby providing a potential fire hazard. Further, in rooms having paneling installed over dry-wall, no seal is commonly provided between the opening in the paneling and the electrical box thus providing an increased danger of electrical fire.

U.S. Pat. No. 915,381 discloses an expansible device to be positioned between an outlet box and a cover plate for preventing sparks from reaching the surrounding woodwork. U.S. Pat. Nos. 3,115,265, 3,530,230, 3,651,245, and 3,720,783 disclose various types of box extenders for use with the electrical box which is recessed from the surface of the wall in which it is mounted.

SUMMARY OF THE INVENTION

The invention, in its broader aspects, provides a fire shield device for use with an electrical box mounted in an opening in a building wall for inhibiting fire in the box from reaching the wall surrounding the opening. The device is formed of fire-resistant material and comprises opposite side and end walls defining a rectangle adapted to fit snugly within the box. The walls of the device have opposite edges, and a substantially continuous, outwardly extending peripheral flange is joined to one of the edges and is adapted to engage the outer surface of the building wall surrounding the opening. The walls of the device have means thereon for breaking-away predetermined peripherally extending segments thereof parallel with the edges thereby selectively to shorten the height of the walls of the device so as to accommodate the device to a particular box and building wall thickness.

A general object of the invention is to provide an improved fire shield device for use with an electrical box for inhibiting fire in the box from reaching a wall surrounding an opening in which the box is mounted.

Another object of the invention is to provide an improved fire shield device of the foregoing object which can readily adapted to fit a particular box and wall height.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
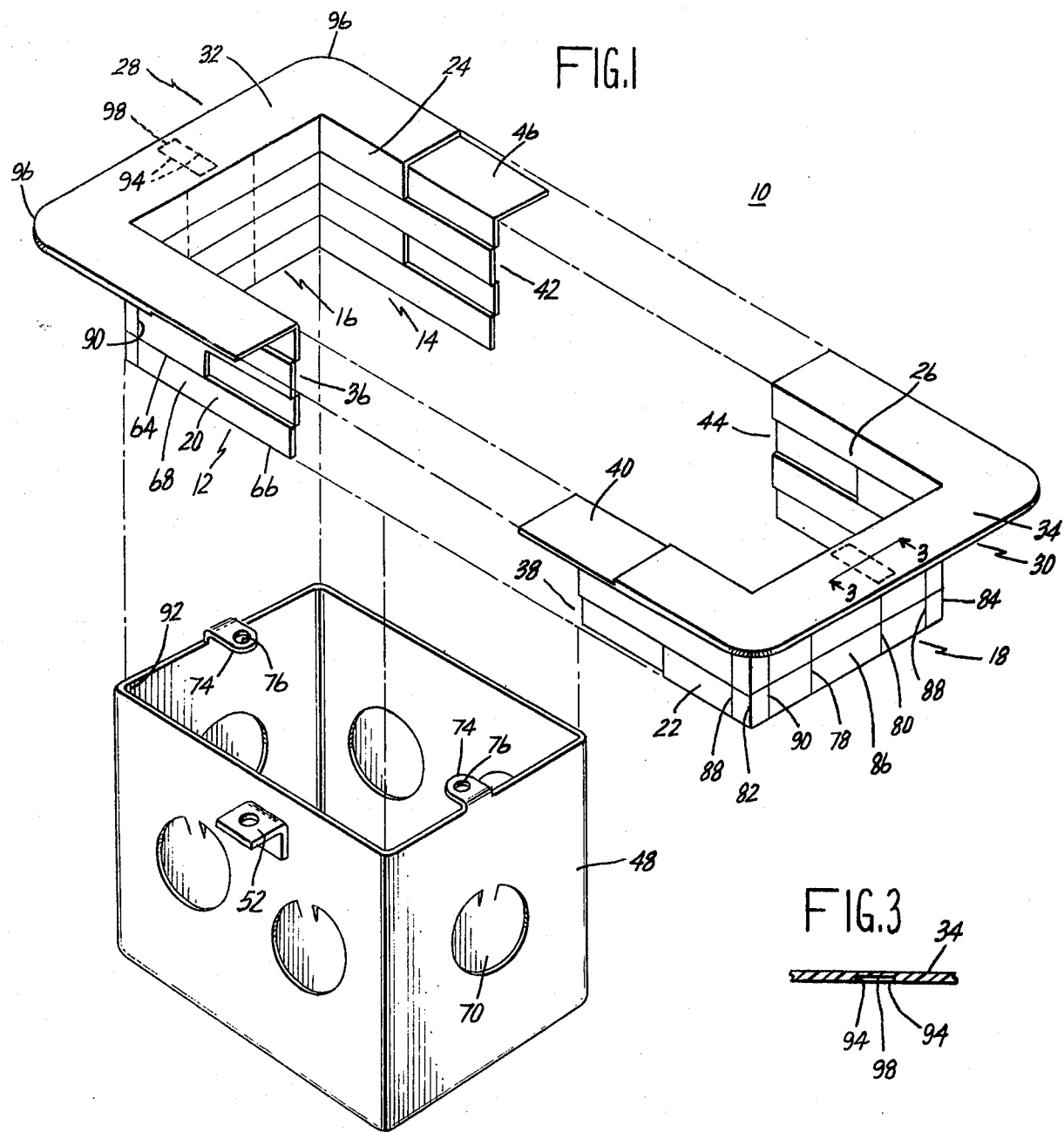
FIG. 1 is a perspective view, partly exploded, illustrating the improved fire shield device of the invention.

Referring now to the figures of the drawing, the improved fire shield device of the invention, generally indicated at 10, is formed of fire-resistant material, such as metal or a fire-resistant plastic, and comprises spaced side walls 12, 14 and end walls 16, 18 defining a rectangular configuration. Each of the side walls 12, 14 is divided into two sections 20, 22, 24, 26, which divides device 10 into two parts 28, 30. Each of the parts 28, 30 has an outwardly extending, peripheral flange 32, 34 joined to its top edge.

The two parts 28, 30 are joined by interlocking fingers 36, 38, 40, 42, 44, 46 respectively formed on the adjoining edges of side wall sections 20, 22, and flanges 32, 34, thus permitting adjustment of the length of device 10 over a considerable range. It will be observed that the provision of fingers 40, 46 on flanges 34, 32, preserve the continuity of flanges 32, 34 so that a substantially continuous peripheral flange is formed around device 10.

Figures 2, 3:
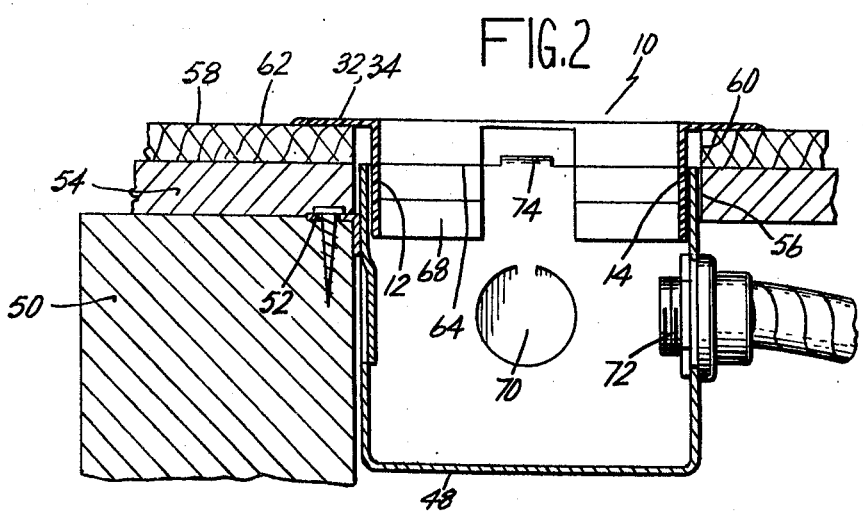
FIG. 2 is a cross-sectional view illustrating the improved fire shield device of the invention in assembled relation with electrical box mounted in a wall opening.
FIG. 3 is a fragmentary cross-sectional view taken along line 3—3 of FIG. 1.

Side walls 12, 14 and end walls 16, 18 of device 10 are adapted to fit snugly within an electrical box 48, as best seen in FIG. 2. Box 48 may conventionally be mounted on stud 50 by means of mounting bracket 52. Conventional dry-wall sheeting 54 is secured to studding 50 and has opening 56 therein into which the upper end of box 48 extends. Dry-wall sheeting 54 may have wood paneling 58 secured thereto having opening 60 formed therein communicating with box 48. It will be seen that flanges 32, 34 of fire shield device 10 engage outer surface 62 of paneling 58 thus sealing the space between the portion of paneling 58 surrounding opening 60 from box 48 to inhibit fire in the box from reaching the paneling.

Side and end walls 12, 14, 16 and 18 of device 10 have spaced grooves 64 formed therein parallel with edges 66 which define peripherally extending segments 68 which may be broken-away, as by the use of a pair of pliers, thereby selectively to adjust the height of the walls of device 10 to accommodate the device to a particular box so as to clear obstructions such as knock-outs 70 and cable connectors 72, and also to accommodate the thickness of the particular paneling 58. It will be understood that in FIG. 2, one of the segments 68 of device 10 has been broken-away.

A typical box 48 has a pair of inwardly extending lugs 74 having tapped openings 76 therein for receiving the screws which attach a convenience outlet or switch (not shown) to the box. In order to accommodate the lugs, end walls 16, 18 of device 10 have spaced parallel, transverse extending grooves 78, 80 formed therein spaced from and intermediate corners 82, 84 thus permitting breaking-away of further segments 86 of end walls 16, 18. It will seen in FIG. 2 that segments 86 of end walls 16, 18 have been broken-away to accommodate lugs 74.

Walls 12, 14, 16, 18 of device 10 further have transversely extending grooves 88, 90 formed therein adjacent and parallel with corners 82, 84 to permit breaking-away the corners to accommodate device 10 to the rounded interior corners 92 of box 48 so that walls 12, 14, 16 and 18 of device 10 may be fitted snugly within the corresponding side walls of box 48.

Flanges 32, 34 have closely spaced, transverely extending grooves 94 formed therein intermediate corners 96 to permit breaking-away thin segments 98 to define narrow slots in flanges 32, 34 for accommodating the screws (not shown) with which the conventional cover plate is attached to the convenience outlet or switch (not shown) mounted in box 48 by lugs 74.

It will be readily understood that end walls 16, 18 of device 10 may also be divided into two sections and interlocking fingers provided thereon so as to permit width-adjustment of box 10 as well as the length adjustment shown.

It will be understood that the improved fire shield device of the invention, while shown proportioned for use with a single outlet box, can be proportioned for use with a gang or multiple box which accommodates two or more switches or outlets. Further, while my improved fire shield device has been shown proportioned for use with a rectangular box, it can equally advantageously be proportioned for use with an octagonal or second box in which case an annular flange would be provided.

It will now be readily seen that the improved fire shield device of the invention provides a barrier to fire without the inconvenience of using plaster or caulking material. It will be seen that the device of the invention minimizes installation time while still meeting fire and building code requirements. The improved fire shield device of the invention may be adjusted to fit many different types of electrical boxes and is not readily broken or damaged. The improved fire shield may be installed after all materials have been placed around a correctly installed electrical box and after the wiring and convenience outlet or switch has been installed therein.

My improved fire shield device can be adjusted to accommodate various thicknesses of paneling and its flange, which does not exceed either the height or width of the cover plate, covers wide gaps around the electrical box.

While there have been described above the principles of this invention in connection with specific apparatus, it is to be clearly understood that this description is made only by way of example and not as a limitation to the scope of the invention.

What is claimed is:

1. For use with an electrical box mounted in an opening in a building wall, a fire shield device for inhibiting fire in said box from reaching said wall surrounding said opening, said device being formed of fire-resistant material and comprising opposite side and end walls defining a rectangle and adapted to fit within said box, said device walls having opposite edges, and a substantially continuous, outwardly extending peripheral flange joined to one of said edges of said device walls and adapted to engage the outer surface of said building wall surrounding said opening, said device walls having means thereon for breaking-away predetermined peripherally extending segments thereof parallel with said edges thereby selectively to shorten the height of said device walls so as to accommodate said device to a particular box and building wall thickness, each of at least two opposite ones of said device walls having means thereon for adjusting the length thereof thereby to accommodate said device to the interior of a particular box.

2. The device of claim 1 wherein each of said two device walls comprises two seperate sections thereby dividing said device into two parts, said adjusting means comprising interlocking fingers on the adjacent ends of the sections of each of said two device walls.

3. The device of claim 1 wherein said means comprises spaced, peripherally extending grooves formed in said device walls parallel with said edges, each of said side walls comprising two separate sections thereby dividing said device into two parts, the adjacent ends of the sections of each said side wall having interlocking fingers thereon for adjusting the length of said device, said device walls respectively defining corners, each of said device walls having grooves formed therein adjacent said corners and parallel therewith for breaking-away said corners, each of said end walls having a pair of spaced grooves therein extending transversely across the same parallel with and spaced from said corners for breaking-away further selected segments of said end walls, each of said flanges joined to said end walls having a pair of closely spaced grooves formed therein extending transversely across the flange intermediate the ends thereof for breaking-away a segment of the flange to define a relatively narrow, transversely extending slot therein.

* * * * *